(12) United States Patent
Carballo et al.

(10) Patent No.: US 7,567,614 B2
(45) Date of Patent: *Jul. 28, 2009

(54) ALTERING POWER CONSUMPTION IN COMMUNICATION LINKS BASED ON MEASURED NOISE

(75) Inventors: Juan Antonio Carballo, Austin, TX (US); Hayden Clavie Cranford, Jr., Cary, NC (US); Gareth John Nicholls, Brockenhurst (GB); Vernon Roberts Norman, Cary, NC (US); Brian Joel Schuh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/136,205

(22) Filed: Jun. 10, 2008

(65) Prior Publication Data

US 2008/0232530 A1 Sep. 25, 2008

Related U.S. Application Data

(63) Continuation of application No. 11/079,952, filed on Mar. 15, 2005, now Pat. No. 7,418,032.

(51) Int. Cl.
*H04B 3/46* (2006.01)

(52) U.S. Cl. .................... 375/227; 375/346; 375/371; 375/224; 375/231; 375/226; 455/67.11; 455/67.12; 455/67.13

(58) Field of Classification Search .............. 375/227, 375/226, 224
See application file for complete search history.

(56) References Cited

U.S. PATENT DOCUMENTS

| 5,086,508 | A | 2/1992 | Furuno ................. 455/69 |
| 5,109,155 | A | 4/1992 | Mukainakano et al. ... 250/208.1 |
| 5,347,222 | A | 9/1994 | Fox et al. ............... 324/322 |
| 5,844,940 | A | 12/1998 | Goodson et al. ........... 375/222 |
| 5,929,982 | A | 7/1999 | Anderson .............. 356/73.1 |
| 6,342,819 | B1 | 1/2002 | Yamada ................. 331/25 |
| 6,690,915 | B1 | 2/2004 | Ito et al. ................ 455/7 |
| 7,099,382 | B2 | 8/2006 | Aronson et al. .......... 375/219 |
| 7,418,032 | B2 * | 8/2008 | Carballo et al. ........... 375/227 |
| 2003/0044316 | A1 | 3/2003 | Hirai et al. ............ 422/56 |
| 2004/0061523 | A1 | 4/2004 | Carballo et al. ........... 326/80 |
| 2004/0179638 | A1 | 9/2004 | Yoshikawa .............. 375/354 |

(Continued)

*Primary Examiner*—Shuwang Liu
*Assistant Examiner*—Kenneth Lam
(74) *Attorney, Agent, or Firm*—Robert A. Voigt, Jr.; Winstead P.C.; Mark McBurney

(57) ABSTRACT

A method, circuit and system for altering the power consumption in communication links. A type of noise and an amount of jitter in a signal transmitted across a communication link is measured. Upon determining the contribution of the measured noise to the measured jitter in the signal, the measured noise is classified based on such contribution and the intensity of the measured jitter. The power consumption in a component(s) of the communication link may be adjusted based on the classification of the measured noise. For example, if the measured noise is classified as being a low amount of noise, then the power consumption of the component(s) may be reduced such as by lowering the voltage of the power supply and/or reducing the complexity of the circuitry. By reducing the power consumption when the communication link is not subject to the worst-case condition, a savings in power consumption may be made.

12 Claims, 5 Drawing Sheets

U.S. PATENT DOCUMENTS

| | | |
|---|---|---|
| 2004/0203477 A1 | 10/2004 | Carballo et al. ............... 455/69 |
| 2005/0031029 A1 | 2/2005 | Yamaguchi et al. ......... 375/226 |
| 2005/0084048 A1 | 4/2005 | Wu ............................ 375/355 |
| 2005/0281193 A1 | 12/2005 | Hofmeister et al. ......... 370/217 |
| 2005/0281355 A1 | 12/2005 | Cranford et al. ............ 375/316 |
| 2005/0286670 A1 | 12/2005 | Jungerman .................. 375/371 |
| 2006/0119382 A1 | 6/2006 | Shumarayev et al. ......... 326/33 |
| 2006/0202714 A1 | 9/2006 | Hoang et al. ................... 326/38 |

* cited by examiner

ALTERING POWER CONSUMPTION IN COMMUNICATION LINKS BASED ON MEASURED NOISE

CROSS REFERENCE TO RELATED APPLICATIONS

The present application is a continuation application of pending U.S. patent application Ser. No. 11/079,952, which was filed on Mar. 15, 2005, which is assigned to the assignee of the present invention. The present application claims priority benefits to U.S. patent application Ser. No. 11/079,952.

TECHNICAL FIELD

The present invention relates to the field of digital transmission, and more particularly to altering the power consumption in transmitter circuits and/or receiver circuits in communication links based on measured noise.

BACKGROUND INFORMATION

As electronic and computer technology continues to evolve, communication of information among different devices, either situated near by or at a distance becomes increasingly important. It is now more desirable than ever to provide high speed communications among different chips on a circuit board, different circuit boards in a system and different systems with each other. It is also desirable to provide high speed communications in intensive data consuming systems using graphical or video information, multiple input-output channels, local area networks, etc.

Data may be transmitted between different devices in a communication system through a "data link". The component that generates and transmits a signal through the data link may be referred to as a "transmitter"; whereas, the component that receives the signal over the data link and extracts information from the signal may be referred to as a "receiver." Typically, data is transmitted in parallel whenever possible in order to increase bandwidth. However, due to cost, weight, interference (noise) and electrical loading considerations, parallel transmission is not feasible in many systems. In order to simplify the communications problem, data may be transmitted serially. By transmitting data serially, less hardware is required for the actual communications link between the different devices.

The transmitted serial data signal in the data link may have timing uncertainties, commonly referred to as "jitter", as a result of what is referred to as "noise." Noise may refer to a disturbance, especially a random and persistent disturbance, that obscures or reduces the clarity of a signal. "Jitter" may refer to the delay between the expected transition of the data signal and the actual transition. That is, "jitter" may refer to an offset of time as to when the serial data signal transitions from a high to a low state or from a low to a high state. When there is more noise in a signal there may result a greater amount of jitter thereby making it more difficult to extract the data from the signal.

Typically, in a digital communication system, data is transmitted by the transmitter without the clock signal for efficiency purposes. The clock signal may be recovered by the receiver by using a circuit commonly referred to as a clock and data recovery circuit. The clock and data recovery circuit may derive the clock signal from the received digital data.

Typically, signal generation circuits (circuits that generate a data signal) in a transmitter and clock and data recovery circuits in a receiver are designed for worst-case conditions, such as being able to handle a maximum amount of noise in the communication system. As stated above, when there is more noise in a signal, the more difficult to extract the data from the signal. This may result in designing transmitter and receiver circuits with complex configurations in order to handle the worst-case conditions. However, in many cases, the transmitted signal may contain less than the maximum amount of noise (worst-case condition), thereby unnecessarily using such complex configurations to generate the signal and/or receive and extract information from the signal. Hence, an excessive amount of power may be unnecessarily used. If the use of such unnecessary power could be reduced or if a less complex configuration could be used when the communication link is not subject to the worst-case condition, then a savings in power consumption may be made.

Therefore, there is a need in the art to reduce the power consumption in communication links (referring to the transmitters and receivers) when the communication links are not subject to the worst-case condition for noise.

SUMMARY

The problems outlined above may at least in part be solved in some embodiments by measuring a type of noise in a signal as well as measuring jitter in the signal. Upon determining the contribution of the measured noise to the measured jitter in the signal, the measured noise is classified based on such contribution and the intensity of the measured jitter. The power consumption in either the transmitter and/or receiver of the communication link may be adjusted based on the classification of the measured noise. For example, if the measured noise is classified as being a low amount of noise, then the power consumption may be reduced such as by lowering the voltage of the power supply (or lowering the current supply) and/or reducing the complexity of the circuitry. By reducing the power consumption in a component(s) of the communication link when the communication link is not subject to the worst-case condition, a savings in power consumption may be made.

In one embodiment of the present invention, a method for altering the power consumption in communication links may comprise the step of measuring a type of noise in a signal. The method may further comprise measuring an overall jitter in the signal. The method may further comprise determining a difference between the measured noise and the measured overall jitter. The method may further comprise using the difference while taking into consideration a quantity of the measured overall jitter to index into a table to obtain an estimator. The method may further comprise classifying the noise in the signal based on the estimator. The method may further comprise adjusting the power consumption of a circuit based on the classification of the noise.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, circuit and system for altering the power consumption in communication links. In one embodiment of the present invention, a type of noise in a signal transmitted across a communication link is measured. Further, the amount of jitter in the signal is measured. Upon determining the contribution of the measured noise to the measured jitter in the signal, the measured noise is classified based on such contribution and the intensity of the measured jitter. The power consumption in either the transmitter and/or receiver of the communication link may be adjusted based on the classification of the measured noise. For example, if the measured noise is classified as being a low amount of noise, then the power consumption in either the transmitter and/or receiver of the communication link may be reduced such as by lowering the voltage of the power supply or lowering the current supply and/or reducing the complexity of the circuitry. By reducing the power consumption in a component(s) of the communication link when the communication link is not subject to the worst-case condition, a savings in power consumption may be made.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
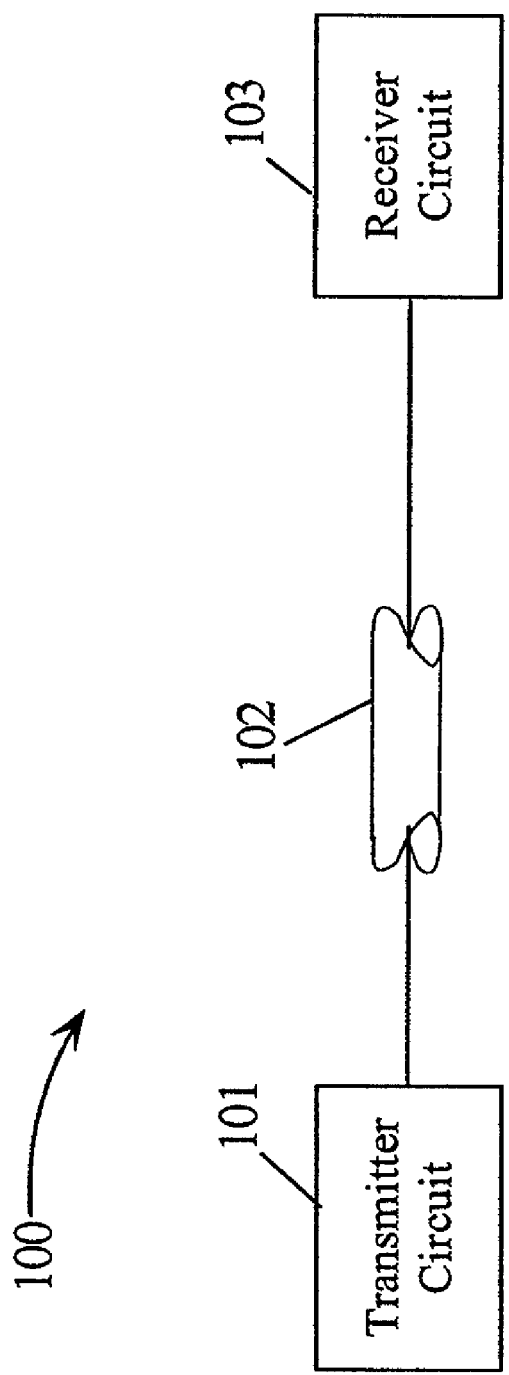
FIG. 1 illustrates an embodiment of the present invention of a serial data link.

FIG. 1—Serial Data Link

FIG. 1 illustrates an embodiment of the present invention of a serial data link 100 used in a communication system. As stated in the Background Information section, data may typically be transmitted between various devices in a communication system through a "data link". Typically, data is transmitted in parallel whenever possible in order to increase bandwidth. However, due to cost, weight, interference (noise) and electrical loading considerations, parallel transmission is not feasible in many systems. In order to simplify the communications problem, data may be transmitted serially across a serial data link 100 by a transmitter 101. Transmitter 101 may be configured to convert the parallel data to a serial form which may be transmitted through a medium 102, e.g., wired, wireless, to a receiver 103 configured to convert the serial data into parallel form which may then be transmitted to another device, e.g., computer, cellular phone. Receiver 103 may further be configured to derive the clock signal from the received data such as in a clock and data recovery circuit. A more detail description of receiver 103 is provided below in association with FIGS. 2-3.

As stated in the Background Information section, transmitter and receiver circuits are designed for worst-case conditions, such as being able to handle a maximum amount of noise in the communication system. When there is more noise in a signal, the more difficult to extract the data from the signal. This may result in designing transmitter and receiver circuits with complex configurations in order to handle the worst-case conditions. However, in many cases, the transmitted signal may contain less than the maximum amount of noise (worst-case condition), thereby unnecessarily using such complex configurations to generate the signal and/or receive and extract information from the signal. Hence, an excessive amount of power may be unnecessarily used. If the use of such unnecessary power could be reduced or if a less complex configuration could be used when the communication link is not subject to the worst-case condition, then a savings in power consumption may be made. Therefore, there is a need in the art to reduce the power consumption in communication links (referring to the transmitters and receivers) when the communication links are not subject to the worst-case condition for noise. Receiver 103 described below in association with FIGS. 2-3 incorporates a mechanism for reducing the power consumption of the receiver when the noise in the serial link is less than the worst-case condition. Further, a method for reducing the power consumption in a communication link is described below in association with FIGS. 4A-B. It is noted that while the description below describes the mechanism for reducing the power consumption in a receiver circuit that the mechanism may be applied to a transmitter as well. It is further noted that a person of ordinary skill would be capable of applying those principles in reducing the power consumption in a receiver circuit to a transmitter circuit and that such embodiments would fall within the scope of the present invention.

Figure 2:
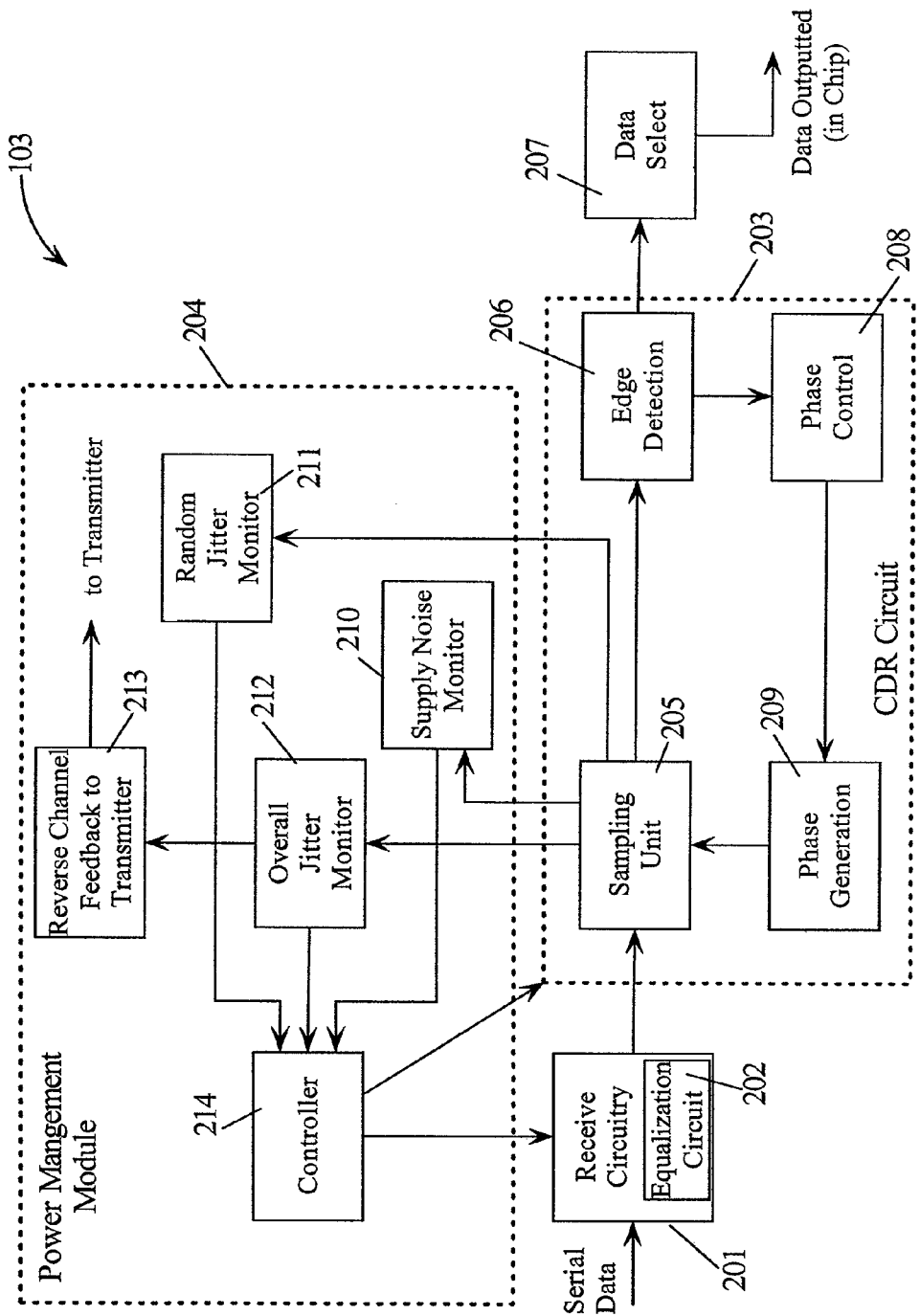
FIG. 2 illustrates an embodiment of a receiver circuit configured in accordance with the present invention.

FIG. 2—Receiver Circuit

FIG. 2 illustrates an embodiment of the present invention of a receiver 103 (FIG. 1). Receiver 103 may comprise a receive circuitry 201 configured to receive the serial data transmitted from transmitter 101 (FIG. 1) over medium 102 (FIG. 1). Receive circuitry 201 may be configured to convert the serial data into parallel form. The conversion of the serial data into parallel form occurs after the clock signal and data have been recovered as discussed below. Receive circuitry 201 may include an equalization circuit 202 configured to compensate the distortion in the received signal. The receive circuitry 201 may be coupled to a clock and data recovery circuit 203 configured to recover the clock signal from the received signal. FIG. 2 further illustrates a power management module 204 coupled to receive circuitry 201 and clock and data recovery circuit 203. Power management module 204 is configured to adjust the power consumption of receiver 103 by adjusting the voltage of the power source of receiver 103 and/or adjusting the circuitry activated in receive circuitry 201 and/or adjusting the circuitry activated in clock and data recovery circuit 203 as discussed further below. It is noted that receiver circuit 103 may include other elements, e.g., a de-serializer in receive circuitry 201 for converting the serial data into a parallel form, that were not depicted for ease of understanding. It is further noted that FIG. 2 is not to be limited in scope to the described embodiment.

As stated above, clock and data recovery circuit 203 is configured to recover the clock signal from the received signal. In one embodiment, clock and data recovery circuit 203 includes a sampling unit 205 configured to sample the received signal. Sampling refers to obtaining a sequence of instantaneous values of the particular signal characteristic, usually at regular time intervals. Sampling may be used so that the edges (transitions) of the received signal can be determined with more accuracy when the signal experiences high frequency jitter. Sampling is well known in the art and hence will not be discussed in further detail for the sake of brevity. Edge detection unit 206 may be configured to detect one or both transitions (edges) of the received signal and provides information as to whether these transitions occur early, late or on-time to a phase control unit 208. Phase control unit 208 may be configured to generate and/or control the clock signals of the sampling latches (not shown) in sampling unit 205 to compensate for low frequency jitter. These clock signals (which can be as many as the number of latches) form the recovered clock signal since they are actually versions (separated by constant phases) of the recovered clock signal. Data is extracted from the received signal that underwent edge detection by data select unit 207. The extracted data may be provided by the samples coming from sampling unit 205 and may then be outputted to the interior circuitry of receiver 103. It is noted that the elements of clock and data recovery circuit 203 are well known in the art and hence will not be described in any further detail for the sake of brevity.

Referring to FIG. 2, power management module 204 may include a supply noise monitor 210 coupled to sampling unit 205. Supply noise monitor 210 is configured to detect and measure the amount of supply noise (referring to the noise created from the supply voltage of receiver 103) in the sampled signal. Power management module 204 may further include a random jitter monitor 211 coupled to sampling unit 205. Random jitter monitor 211 is configured to detect and measure the random component of the overall jitter in the sampled signal. Random jitter may refer to jitter caused by temperature variations as well as power supply noise and crosstalk. Power management module 204 may further include an overall jitter monitor 212 coupled to sampling unit 205. Overall jitter monitor 212 is configured to detect and measure the overall jitter of the sampled signal. The overall jitter may refer to the delay between the expected transition of the signal and the actual transition. Power management module 204 may further include a unit 213 (referred to herein as the "feedback unit") configured to transmit one or measurements, e.g., measurement of overall jitter by monitor 212, to transmitter 101. It is noted that while FIG. 2 illustrates unit 213 transmitting the measurement of the overall jitter to transmitter 101 that unit 213 may transmit other types of measurements, such as the supply noise measured by supply noise monitor 210. These measurements may be provided to a controller (not shown) in transmitter 101 configured to adjust the power consumption in transmitter 101. Such a controller in transmitter 101 may be configured similarly to the controller, described below, in receiver 103.

Power management module 204 may further include a controller 214 coupled to overall jitter monitor 212, random jitter monitor 211 and supply noise monitor 210. Controller 214 may be configured to determine the deterministic component of the overall jitter by computing the difference between the random jitter and the overall jitter in the sampled signal. Overall jitter may roughly equal random jitter plus deterministic jitter. Deterministic jitter may refer to the component of jitter attributable to the data pattern in medium 102 (FIG. 1). Controller 214 may be further configured to adjust the power consumption of receive circuit 103 as discussed below in association with FIG. 3.

FIG. 3—Controller

Figure 3:
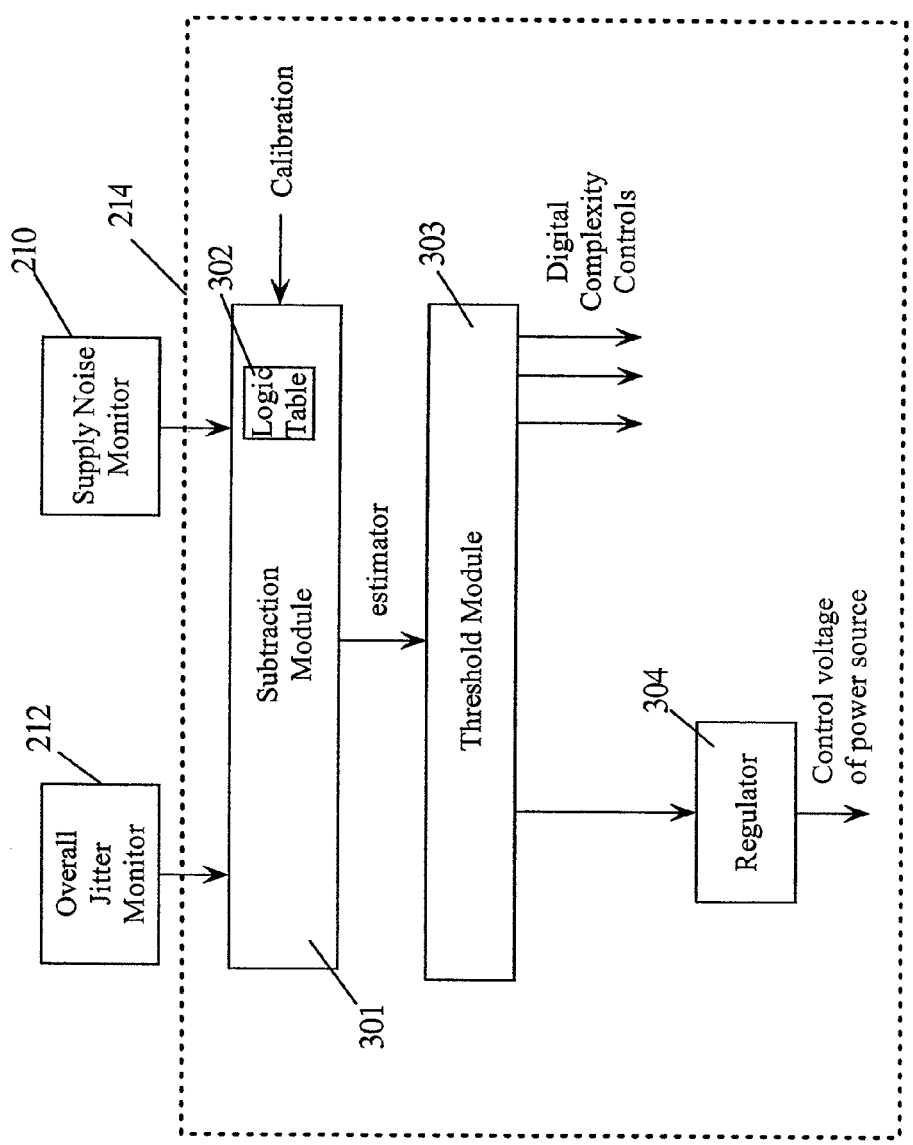
FIG. 3 illustrates an embodiment of a controller in the receiver circuit configured in accordance with the present invention.

FIG. 3 illustrates an embodiment of the present invention of controller 214 (FIG. 2). As illustrated in FIG. 2, overall jitter monitor 212 (FIG. 2) and supply noise monitor 210 (FIG. 2) are coupled to controller 214. It is noted that random jitter monitor 211 may also be coupled to controller 214 as illustrated in FIG. 2. However, in the embodiment of controller 214 illustrated in FIG. 3, controller 214 is not shown coupled to random jitter monitor 211. In one embodiment, controller 214 may not need such information to adjust the power consumption of receiver 103 (FIG. 2) as described below. In other embodiments, controller 214 may need such information or information from measuring other types of noise. It is noted that a person of ordinary skill would be capable of implementing such embodiments and that such embodiments would fall within the scope of the present invention.

Referring to FIG. 3, controller 214 may include a subtraction module 301 coupled to overall jitter monitor 212 and supply noise monitor 210. Subtraction module 301 may be configured to receive the measured supply noise in the sampled signal from supply noise monitor 210 and to receive the measured overall jitter in the sampled signal from overall jitter monitor 212. Subtraction module 301 may be further configured to index into a logical table 302 using the difference between the received measured supply noise and the received measured overall jitter while taking into consideration the quantity of the measured overall jitter. The indexed entry in logic table 302 includes a value, referred to herein as an "estimator". It is noted that logic table 302 may be calibrated such that the values stored in the entries of logic table 302 may be modified. These values or estimators are used by collector 214, as described below, in adjusting the power consumption of receiver circuit 103.

Controller 214 may further include a threshold module 303 coupled to subtraction module 301. Threshold module 303 may be configured to classify the measured supply noise in the received signal by comparing the received estimator with one of the following: a single threshold, a value in an entry in the look-up table and multiple thresholds. For example, in the scenario of using a single threshold, if the estimator is less than the single threshold, then that may indicate that the supply noise is low and hence threshold module 303 may reduce the power consumption of receiver circuit 103. Threshold module 303 may reduce the power consumption of receiver circuit 103 by issuing a command to a regulator 304 of receiver circuit 103 to lower the voltage of the power supply (not shown) or to lower the current supply (not shown) of receiver circuit 103. In another example, threshold module 303 may reduce the power consumption of receiver circuit 103 by reducing the complexity of receiver circuit 103. Threshold module 303 may reduce the complexity of receiver circuit 103 by issuing a command (indicated in FIG. 3 as "digital complexity controls") to receive circuitry 201 (FIG. 2) to instruct equalization circuit 202 (FIG. 2) to selectively deactivate components. For example, threshold module 303 may issue a command to receive circuitry 201 to operate in a first mode instead of a second mode where the first mode uses fewer components to operate (e.g., the number and power of equalization taps). Similarly, threshold module 303 may reduce the power consumption of receiver circuit 103 by issuing a command (indicated in FIG. 3 as "digital complexity controls") to clock and data recovery circuit 203 to selectively deactivate components. For example, threshold module 303 may issue a command to clock and data recovery circuit 203 to operate in a first mode instead of a second mode where the first mode uses fewer components to operate (e.g., the size of one of the internal filters).

Alternatively, if the estimator is greater than the single threshold, then threshold module 303 may increase the power consumption of receiver circuit 103. Threshold module 303 may increase the power consumption of receiver circuit 103 by issuing a command to regulator 304 of receiver circuit 103 to increase the voltage of the power supply (not shown) or to lower the current supply of receiver circuit 103. In another example, threshold module 303 may increase the power consumption of receiver circuit 103 by increasing the complexity of receiver circuit 103. Threshold module 303 may increase the complexity of receiver circuit 103 by issuing a command (indicated in FIG. 3 as "digital complexity controls") to receive circuitry 201 to instruct equalization circuit 202 (FIG. 2) to selectively activate components, e.g., such as a command to operate in a second mode instead of a first mode where the second mode uses a greater number of components to operate. Similarly, threshold module 303 may increase the power consumption of receiver circuit 103 by issuing a command (indicated in FIG. 3 as "digital complexity controls") to clock and data recovery circuit 203 to selectively activate components, e.g., such as a command to operate in a second mode instead of a first mode where the second mode uses a greater number of components to operate.

In an example of the scenario when the estimator is compared with multiple thresholds, threshold module 303 may identify the lowest threshold that the estimator exceeds and based on this threshold issue a command to regulator 304 and/or receive circuitry 201 and/or clock and data recovery circuit 203 to adjust the power consumption accordingly as described above. In an example of the scenario when the estimator is compared with an entry of a look-up table, threshold module 303 may access an entry of a look-up table (not shown) comprising a plurality of values based on the value of the estimator. The accessed value is then compared with the value of the estimator. As with the scenario of comparing the estimator with a single threshold, if the estimator is less than the value accessed from the table, then that may indicate that the supply noise is low and hence threshold module 303 may be configured to reduce the power consumption of receiver circuit 103 as described above. Alternatively, if the estimator is greater than value accessed from the table, then that may indicate that the supply noise is high and hence threshold module 303 may be configured to indicate to receiver circuit 103 to increase the power consumption of receiver circuit 103 as described above.

A method for reducing the power consumption of receiver 103 when the measured noise in medium 102 (FIG. 1) is less than the worst-case condition is described below in association with FIGS. 4A-B.

Figure 4A:
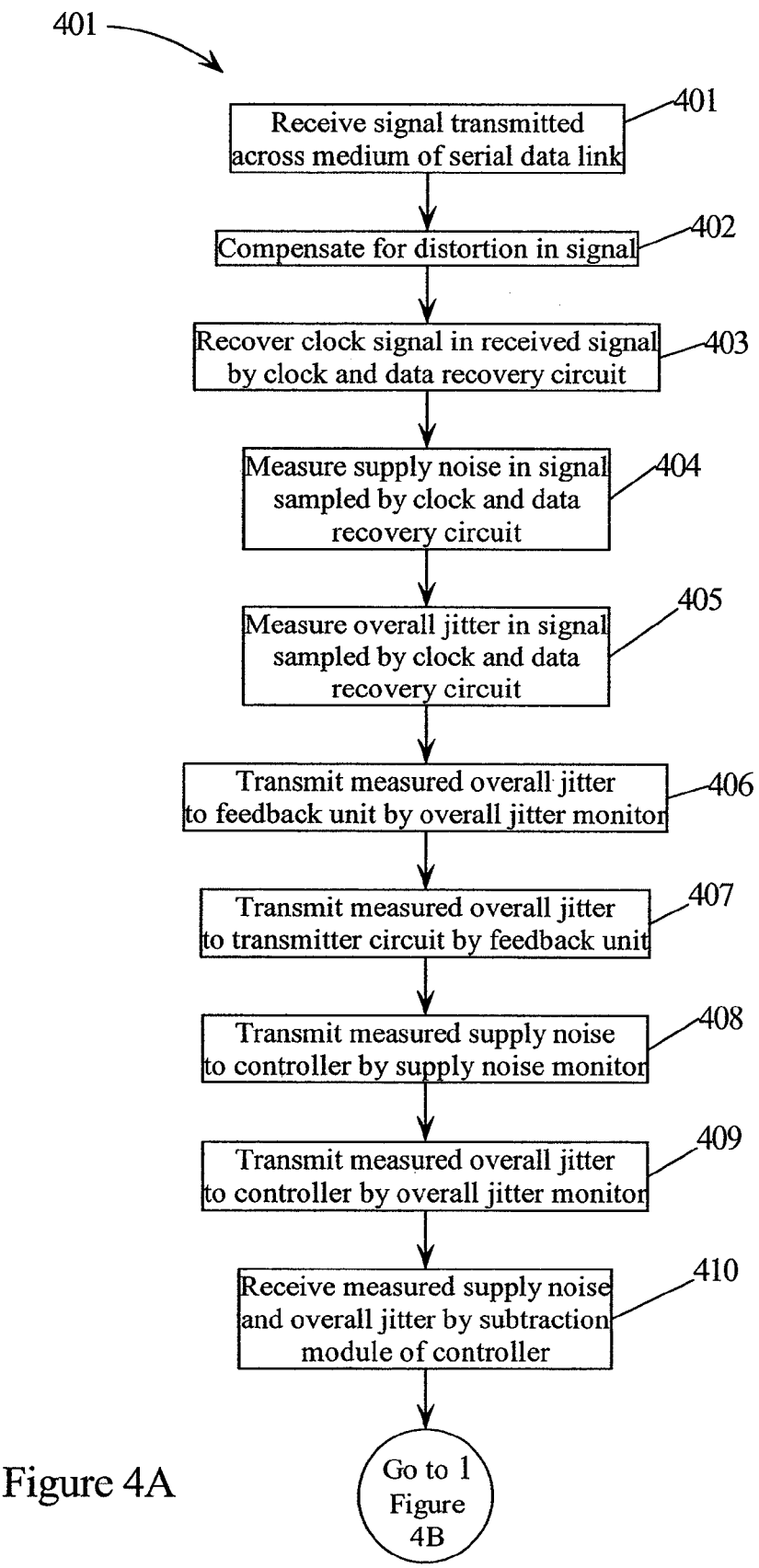
FIGS. 4A-B are a flowchart of a method for altering the power consumption in communication links in accordance with an embodiment of the present invention.
Figure 4B:
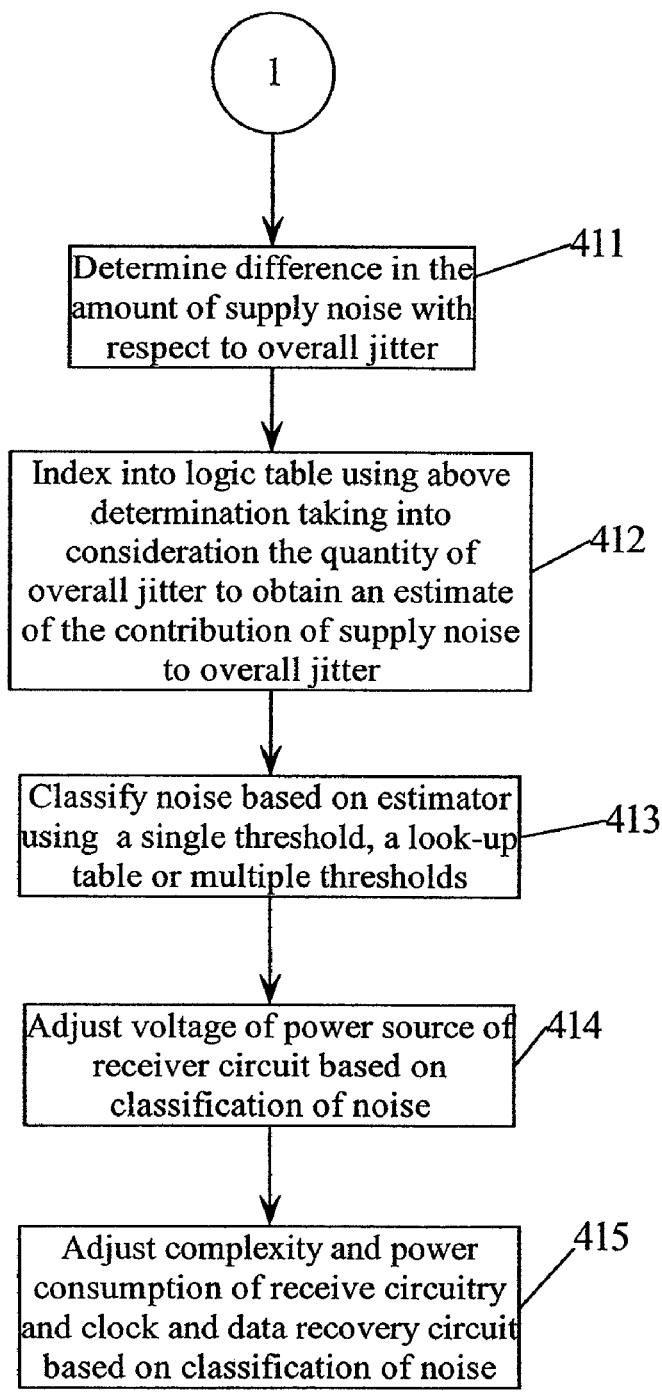

FIGS. 4A-B—Method for Altering the Power Consumption in Communication Links

FIGS. 4A-B are a flowchart of one embodiment of the present invention of a method 400 for altering the power consumption in communication links, such as reducing the power consumption in serial link 100 (FIG. 1) when the measured noise in the communication link is less than the worst-case condition thereby resulting in a savings in power consumption.

Referring to FIG. 4A, in conjunction with FIGS. 1-3, in step 401, receive circuitry 201 receives a signal transmitted across medium 102 of serial data link 100. In step 402, equalization circuit 202 compensates for distortion in the received signal. In step 403, clock and data recovery circuit 203 recovers the clock signal from the received signal as described above.

In step 404, supply noise monitor 210 in power management module 204 measures the supply noise in the received signal sampled by clock and data recovery circuit 203. In step 405, overall jitter monitor 212 in power management module 204 measures the overall jitter in the received signal sampled by clock and data recovery circuit 203.

In step 406, overall jitter monitor 212 transmits the measured overall jitter to feedback unit 213. In step 407, feedback unit 213 transmits the measured overall jitter to transmitter circuit 101.

In step 408, supply noise monitor 210 transmits the measured supply noise to controller 214. In step 409, overall jitter monitor 212 transmits the measured overall jitter to controller 214. In step 410, subtraction module 301 of controller 214 receives the measured supply noise and measured overall jitter.

Referring to FIG. 4B, in conjunction with FIGS. 1-3, in step 411, subtraction module 301 determines the difference in the amount of supply noise with respect to the overall jitter. In step 412, subtraction module 301 indexes into logic table 302 using the determination performed in step 411 taking into consideration the quantity of the overall jitter to obtain an estimate ("estimator") of the contribution of the supply noise to the overall jitter.

In step 413, threshold module 303 classifies the noise based on the estimator using either a single threshold, a look-up table or multiple thresholds as described above.

In step 414, threshold module 303 adjusts the voltage of the power source of receiver circuit 103 based on the classification of the noise. In step 415, threshold module 303, alternatively or in addition to step 414, adjusts the complexity and power consumption of receive circuitry 201 and/or clock and data recovery circuit 203 based on the classification of the noise.

It is noted that method 400 may include other and/or additional steps that, for clarity, are not depicted. It is further noted that method 400 may be executed in a different order presented, e.g., steps 404-405; 406-409; 414-415, and that the order presented in the discussion of FIG. 4 is illustrative. It is further noted that certain steps in method 400, e.g., steps 404-405; 406, 408 and 409; 414 and 415, may be executed in a substantially simultaneous manner.

Although the method, circuit and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A circuit, comprising:
   a receive circuitry configured to receive a signal transmitted over a communication link;
   a clock and data recovery circuit coupled to said receive circuitry, wherein said clock and data recovery circuit is configured to recover a clock signal from said received signal;
   a noise monitor coupled to a sampling unit in said clock and data recovery circuit, wherein said noise monitor is configured to measure a type of noise in said received signal sampled by said sampling unit;
   an overall jitter monitor coupled to said sampling unit in said clock and data recovery circuit, wherein said overall jitter monitor is configured to measure an overall jitter in said received signal sampled by said sampling unit; and
   a controller coupled to said noise monitor and to said overall jitter monitor, wherein said controller comprises:
   a first module, wherein said first module is configured to receive said measured noise and said measured overall jitter, wherein said first module is further configured to determine a difference between said measured noise and said measured overall jitter, wherein said first module is further configured to use said difference while taking into consideration a quantity of said measured overall jitter to index into a table to obtain an estimator; and a second module coupled to said first module, wherein said second module is configured to classify said noise in said received signal based on said estimator, wherein said second module is further configured to adjust power consumption of said circuit based on said classification of said noise.

2. The circuit as recited in claim 1, wherein said second module is further configured to adjust a voltage of a power source based on said classification of said noise.

3. The circuit as recited in claim 1, wherein said receive circuitry comprises an equalization circuit configured to compensate distortion in said received signal, wherein said second module is further configured to adjust an amount of compensation said equalization circuit performs on said received signal based on said classification of said noise.

4. The circuit as recited in claim 1 further comprises:
a unit coupled to said overall jitter monitor, wherein said unit is configured to transmit said measured overall jitter to a transmitter.

5. The circuit as recited in claim 1, wherein said classification is based on comparing said estimator with one of the following: a single threshold, a value in an entry in a look-up table and multiple thresholds.

6. The circuit as recited in claim 1, wherein said noise comprises supply noise.

7. A system, comprising:
a transmission medium;
a transmitter circuit coupled to said transmission medium, wherein said transmitter circuit is configured to transmit a signal; and
a receiver circuit coupled to said transmission medium, wherein said receiver circuit comprises:
a receive circuitry configured to receive said transmitted signal;
a clock and data recovery circuit coupled to said receive circuitry, wherein said clock and data recovery circuit is configured to recover a clock signal from said received signal;
a noise monitor coupled to a sampling unit in said clock and data recovery circuit, wherein said noise monitor is configured to measure a type of noise in said received signal sampled by said sampling unit;
an overall jitter monitor coupled to said sampling unit in said clock and data recovery circuit, wherein said overall jitter monitor is configured to measure an overall jitter in said received signal sampled by said sampling unit; and
a controller coupled to said noise monitor and to said overall jitter monitor, wherein said controller comprises:
a first module, wherein said first module is configured to receive said measured noise and said measured overall jitter, wherein said first module is further configured to determine a difference between said measured noise and said measured overall jitter, wherein said first module is further configured to use said difference while taking into consideration a quantity of said measured overall jitter to index into a table to obtain an estimator; and
a second module coupled to said first module, wherein said second module is configured to classify said noise in said received signal based on said estimator, wherein said second module is further configured to adjust power consumption of said receiver circuit based on said classification of said noise.

8. The system as recited in claim 7, wherein said second module is further configured to adjust a voltage of a power source of said receiver circuit based on said classification of said noise.

9. The system as recited in claim 7, wherein said receive circuitry comprises an equalization circuit configured to compensate distortion in said received signal, wherein said second module is further configured to adjust an amount of compensation said equalization circuit performs on said received signal based on said classification of said noise.

10. The system as recited in claim 7, wherein said receiver circuit further comprises:
a unit coupled to said overall jitter monitor, wherein said unit is configured to transmit said measured overall jitter to said transmitter circuit.

11. The system as recited in claim 7, wherein said classification is based on comparing said estimator with one of the following: a single threshold, a value in an entry in a look-up table and multiple thresholds.

12. The system as recited in claim 7, wherein said noise comprises supply noise.

* * * * *